(12) United States Patent
Steber

(10) Patent No.: US 9,845,116 B2
(45) Date of Patent: Dec. 19, 2017

(54) SUPPORT STRUCTURE IN FRAMEWORK CONSTRUCTION, AND METHOD FOR PRODUCING SAME

(71) Applicant: Bayerische Motoren Werke Aktiengesellschaft, Munich (DE)

(72) Inventor: Gerhard Steber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/178,687

(22) Filed: Jun. 10, 2016

(65) Prior Publication Data

US 2016/0280285 A1  Sep. 29, 2016

Related U.S. Application Data

(63) Continuation of application No. PCT/EP2014/076255, filed on Dec. 2, 2014.

(30) Foreign Application Priority Data

Dec. 13, 2013 (DE) .................. 10 2013 225 909

(51) Int. Cl.
*B62D 29/04* (2006.01)
*B62D 65/02* (2006.01)
(Continued)

(52) U.S. Cl.
CPC .......... *B62D 29/048* (2013.01); *B29C 70/766* (2013.01); *B29C 70/86* (2013.01);
(Continued)

(58) Field of Classification Search
None
See application file for complete search history.

(56) References Cited

U.S. PATENT DOCUMENTS

| 3,685,862 A | 8/1972 | Rudolf |
| 6,067,767 A | 5/2000 | Schuetze |

(Continued)

FOREIGN PATENT DOCUMENTS

| CN | 102734288 A | 10/2012 |
| CN | 103261007 A | 8/2013 |

(Continued)

OTHER PUBLICATIONS

International Search Report (PCT/ISA/210) issued in PCT Application No. PCT/EP2014/076255 dated Mar. 9, 2015 with English translation (Four (4) pages).

(Continued)

*Primary Examiner* — Glenn Dayoan
*Assistant Examiner* — Melissa A Black
(74) *Attorney, Agent, or Firm* — Crowell & Moring LLP

(57) ABSTRACT

A support structure in a framework construction is provided. The support structure includes a first and a second rod of an axle support of a motor vehicle, a positioning element, and a first and a second fiber winding. The positioning element fixes an alignment of the first rod relative to an alignment of the second rod. A first support section of the positioning element is drawn by the first fiber winding in the direction of a support section of the first rod, and a second support section of the positioning element is drawn by the second fiber winding in the direction of a support section of the second rod in order to hold the first and second rods in the fixed alignment relative to each other by a frictional connection.

20 Claims, 4 Drawing Sheets

(51) Int. Cl.
  *B62D 23/00*  (2006.01)
  *B29C 70/76*  (2006.01)
  *B29C 70/86*  (2006.01)

(52) U.S. Cl.
  CPC ......... *B62D 23/005* (2013.01); *B62D 29/041* (2013.01); *B62D 65/02* (2013.01)

(56) References Cited

U.S. PATENT DOCUMENTS

| | | |
|---|---|---|
| 2012/0263521 A1 | 10/2012 | Auer et al. |
| 2014/0021747 A1 | 1/2014 | Goettker et al. |

FOREIGN PATENT DOCUMENTS

| | | |
|---|---|---|
| DE | 1 936 903 | 2/1971 |
| DE | 44 23 642 C1 | 10/1995 |
| DE | 197 24 535 C1 | 7/1998 |
| DE | 10 2011 100 334 A1 | 11/2012 |
| EP | 2 251 553 A1 | 11/2010 |
| EP | 2 360 082 A1 | 8/2011 |
| EP | 2 511 084 A1 | 10/2012 |
| WO | WO 2012/079693 A1 | 6/2012 |

OTHER PUBLICATIONS

German-language Written Opinion (PCT/ISA/237) issued in PCT Application No. PCT/EP2014/076255 dated Mar. 9, 2015 (Five (5) pages).

German-language Search Report issued in counterpart German Application No. 10 2013 225 909.3 dated Feb. 3, 2014 with partial English translation (Ten (10) pages).

"Bambus als Baumaterial", Retrieved from URL: http://bambus.rwth-aachen.de/de/PDF-Files/Bambus%20als%20Baumaterial%20-%20Version%202.pdf; published on Oct. 26, 2012 (Seventeen (17) pages).

Chinese-language Office Action issued in counterpart Chinese Application No. 201480055836.X dated Dec. 27, 2016 with English translation (Ten (10) pages).

SUPPORT STRUCTURE IN FRAMEWORK CONSTRUCTION, AND METHOD FOR PRODUCING SAME

CROSS REFERENCE TO RELATED APPLICATIONS

This application is a continuation of PCT International Application No. PCT/EP2014/076255, filed Dec. 2, 2014, which claims priority under 35 U.S.C. §119 from German Patent Application No. 10 2013 225 909.3, filed Dec. 13, 2013, the entire disclosures of which are herein expressly incorporated by reference.

This application contains subject matter related to U.S. application Ser. No. 15/178,681, entitled "Assembly Comprising a Frame Element and a Connecting Element, and Method for Securing a Connecting Element to a Frame Element", and U.S. application Ser. No. 15/178,710, entitled "Assembly Consisting of a Frame Element, a Connecting Element and a Part Secured to the Connecting Element," both filed on Jun. 10, 2016.

BACKGROUND AND SUMMARY OF THE INVENTION

The invention relates to a support structure in framework construction, and in particular to a support structure of an axle carrier of a motor vehicle, and to a corresponding method for producing same.

A support structure in framework construction includes a multiplicity of rods, wherein the two ends of each rod bear against respective truss joints or nodes on other rods or on corresponding ends of the other rods and are fastened to the other rods by use of a suitable connecting element.

Where metal is used as the material for the rods, the fastening can be realized, for instance, by welding. Furthermore, the rods can by fastened one to another by bolted joints, rivets or by the use of a connecting element having curved portions which at least partially enclose the rods to be connected and which are fastened to the rods by means of an adhesive. Where an adhesive is used to connect the rods to the curved portions of the connecting element, large areas of the connecting element must however be provided as adhesive surfaces in order to achieve sufficient stability of the support structure, which leads to an increase in weight of the support structure.

In order to reduce the weight and thus lower the fuel consumption of a motor vehicle, in the automotive industry components in lightweight construction are increasingly being used. For instance, as the material for the rods of an axle carrier, fiber-reinforced plastics can be used. Particularly where carbon fibers are used as the fiber component of the fiber-reinforced plastic in conjunction with aluminum, a corrosion of the aluminum material can occur, however, due to the very high electrical potential between these two materials. Furthermore, where bolted joints are used to connect the ends of the rods at the nodes, complex assembly operations are necessary, whereby the production time required to produce the axial carrier, and thus the production costs, are increased.

An object of the invention is to provide a support structure in framework construction and a method for producing same, with which the product costs can be lowered, at the same time as the weight of the support structure is reduced.

These objects are achieved by a support structure in framework construction and a method for producing a support structure in framework construction according to embodiments of the invention.

A support structure in framework construction according to the invention includes a first and a second rod of an axle carrier of a motor vehicle, a positioning element, and a first and a second fiber winding, wherein the positioning element defines an orientation of the first rod relative to an orientation of the second rod, and a first supporting portion of the positioning element is drawn by the first fiber winding in the direction of a supporting portion of the first rod, and a second supporting portion of the positioning element is drawn by the second fiber winding in the direction of a supporting portion of the second rod, in order to secure the first and the second rod in the defined relative orientation to each other by way of frictional engagement.

Through the use of fiber windings to connect the rods, where rods made of a non-metallic material are used, the danger of corrosion of elements of the support structure can be precluded. Furthermore, the production time and thus the production costs of the support structure can be lowered, since complex assembly operations, as in the use of rivets for fastening purposes, are eliminated. In addition, the weight can be reduced in comparison to previous known adhesive joints, since, due to the provision of the fiber windings, no extensive adhesive surfaces on the rods are necessary. Because of the unnecessary extensive adhesive surfaces on the rods, these can be produced in a cost-effective manner, for instance, by way of a pultrusion process.

According to one embodiment, the first and the second supporting portion of the positioning elements can have a respective guide device, by which the first and the second fiber winding are respectively guided. The guide devices are here preferably designed such that the fiber windings run on geodetic lines. As a result, the stability of the support structure can be increased, since the fiber windings cannot slip off, which would lead to instability of the connections.

Preferably, the first supporting portion of the positioning element is fastened to the supporting portion of the first rod, and the second supporting portion of the positioning element is fastened to the supporting portion of the second rod, additionally by way of an integrally bonded connection.

Already prior to the fitting of the fiber windings, the integrally bonded connection ensures that the relative orientation of the rods is defined, whereby the fitting of the fiber windings is facilitated. Furthermore, the stability of the support structure is further increased by the provision of the integrally bonded connections.

The integrally bonded connections can be realized by respective adhesives provided between the first supporting portion of the positioning element and the supporting portion of the first rod, and the second supporting portion of the positioning element and the supporting portion of the second rod.

According to one embodiment, a distance between an end portion of the positioning element, which end portion adjoins an exposed portion of the first rod, decreases steadily or incrementally in the direction of another end portion of the positioning element down to a substantially constant value. As a result of this design, notch effects can be improved and peak stresses dampened. Furthermore, adjoining the end portion of the positioning element, a protruding bead, consisting of adhesive, can be formed in order to further dampen the peak stresses.

Preferably, the positioning element is configured as a half-shell, whereof the surface facing the supporting portion of the first rod rests by positive engagement on the supporting portion of the first rod. As a result of this positive engagement, a further increase in the stability of the support structure is achieved.

In another embodiment, the positioning element can be configured as a tongue, wherein the first supporting portion and the second supporting portion of the positioning element are connected by a curved portion. The curvature of the curved portion here defines an angle which the first and the second rod form with each other.

The fiber windings can include at least one fiber, selected from a carbon fiber, a glass fiber, an aramid fiber and a natural fiber.

The at least one fiber can here be embedded in a matrix material, selected from a thermoplastic matrix material and a thermosetting matrix material.

In addition, the first rod and/or the second rod can include a fiber-reinforced plastic or a metal, and the positioning element can be formed from a plastic, a fiber-reinforced plastic or from a metal.

Preferably, the first and the second rod and the positioning element are formed from a fiber-reinforced plastic, wherein the fiber windings are respectively constituted by a fiber winding formed from a synthetic fiber.

As a result of this material-related design of the corresponding elements of the support structure according to the invention, no corrosion occurs and, in addition, the first and the second rod, the positioning element and the fiber windings can be designed such that they have the same or similar thermal coefficients of expansion.

A method for producing a support structure in framework construction arranges a first supporting portion of a positioning element on a supporting portion of a first rod of an axle carrier of a motor vehicle, arranges a second supporting portion of the positioning element on a supporting portion of a second rod of an axle carrier of a motor vehicle, connects the first supporting portion of the positioning element to the supporting portion of the first rod by a fiber winding, which draws the first supporting portion of the positioning element in the direction of the supporting portion of the first rod, and connects the second supporting portion of the positioning element to the supporting portion of the second rod by a further fiber winding, which draws the second supporting portion of the positioning element in the direction of the supporting portion of the second rod, in order to secure the first and the second rod in a defined relative alignment to each other via frictional engagement.

The first and the second supporting portion of the positioning element can have a respective guide device, wherein portions of the first and of the second fiber winding are respectively inserted into the corresponding guide device.

Furthermore, the first supporting portion of the positioning element can be fastened to the supporting portion of the first rod, and the second supporting portion of the positioning element can be fastened to the supporting portion of the second rod, by way of an integrally bonded connection.

For the creation of the integrally bonded connections, respective adhesives can be provided between the first supporting portion of the positioning element and the supporting portion of the first rod, and the second supporting portion of the positioning element and the supporting portion of the second rod.

Preferably, a distance between an end portion of the positioning element, which end portion adjoins an exposed portion of the first rod, decreases steadily or incrementally in the direction of another end portion of the positioning element down to a substantially constant value.

Furthermore, adjoining the end portion of the positioning element, a protruding bead, consisting of adhesive, can be formed.

Preferably, the positioning element is configured as a half-shell, whereof the surface facing the supporting portion of the first rod is placed by positive engagement on the supporting portion of the first rod.

According to another embodiment, the positioning element can be configured as a tongue, wherein the first supporting portion and the second supporting portion of the positioning element are connected by a curved or arcuate portion.

The fiber windings can comprise at least one fiber, selected from a carbon fiber, a glass fiber, an aramid fiber and a natural fiber.

Furthermore, the at least one fiber can be embedded in a matrix material, selected from a thermoplastic matrix material and a thermosetting matrix material.

The first rod and/or the second rod can include a fiber-reinforced plastic or a metal, or can be formed completely of a fiber-reinforced plastic or a metal, whilst the positioning element can be formed from a plastic, a fiber-reinforced plastic or from a metal.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
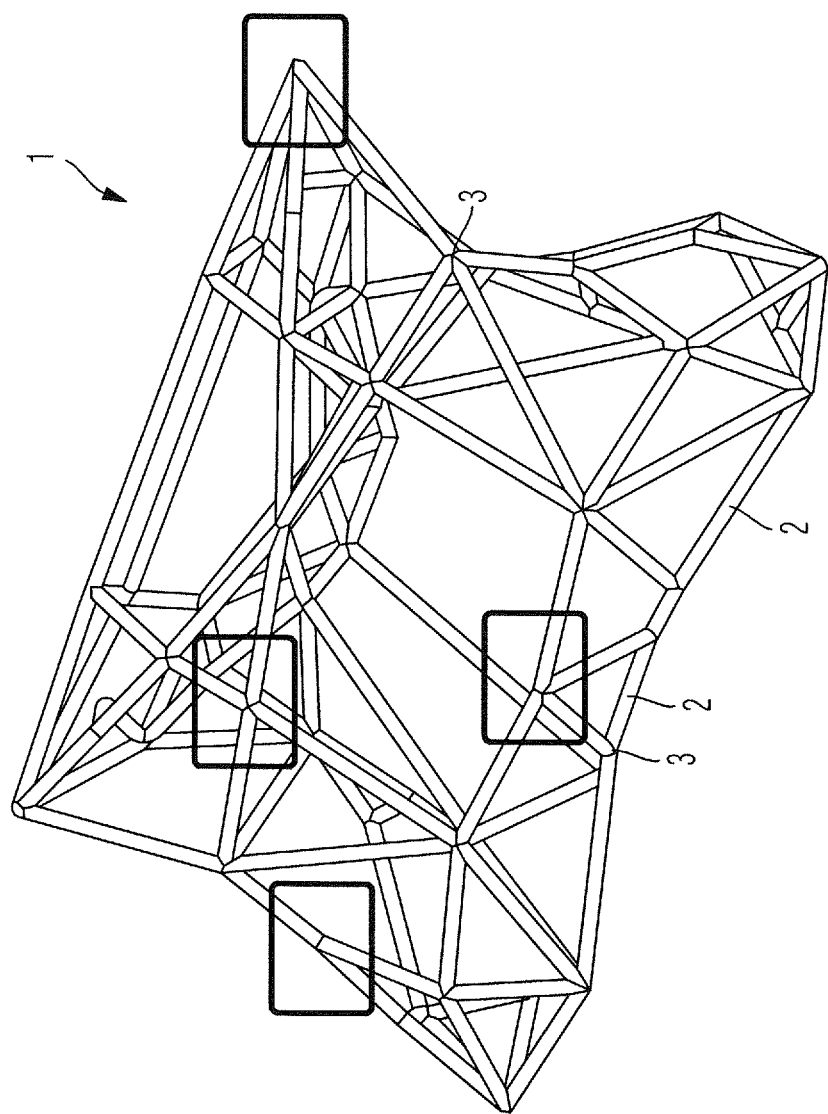
FIG. 1 shows an embodiment of a support structure in framework construction, based on the example of a rear axle carrier of a motor vehicle.

FIG. 1 illustrates an embodiment of a support structure in framework construction based on the example of a rear axle carrier of a motor vehicle. The support structure 1 has a plurality of rods 2, which can be configured as tubes or profiles. The two ends of each rod bear in a respective node 3 (some nodes being marked by a respective rectangle in FIG. 1) against an end of another rod 2, against ends of a plurality of rods 2 or against a portion of another full-length rod 2. Here, each of the rods 2 is a component part of a compartment, i.e. of a triangle or polygon of rods 2. Due to this arrangement of the rods 2, in the individual elements substantially only compressive and tensile forces are generated, which results in a high load-bearing capacity of the support structure.

The rods 2 can include, for instance, a metal, such as, say, aluminum or a fiber-reinforced plastic, or can be formed completely of a metal or a fiber-reinforced plastic. Where a fiber-reinforced plastic or a fiber composite is used as the material for the rods 2, both thermosetting and thermoplastic materials can be used as the matrix. For the fibers, carbon fibers, glass fibers, aramid fibers, natural fibers, etc. can be used. According to one embodiment, the rods 2, including a fiber-reinforced plastic, can be produced by way of a pultrusion process for the production of fiber-reinforced plastics profiles.

Figure 2A:
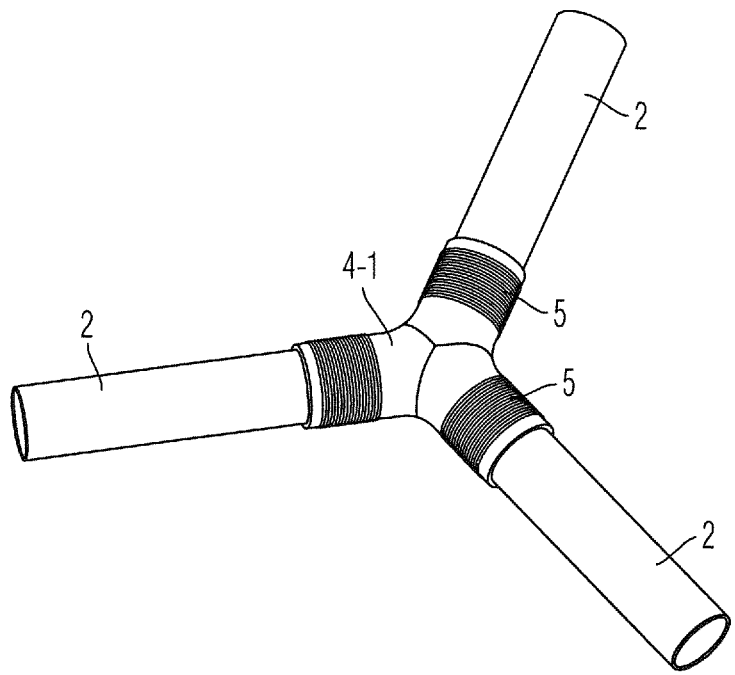
FIGS. 2A and 2B show detailed views of a truss joint in which the ends of three rods meet.
Figure 2B:
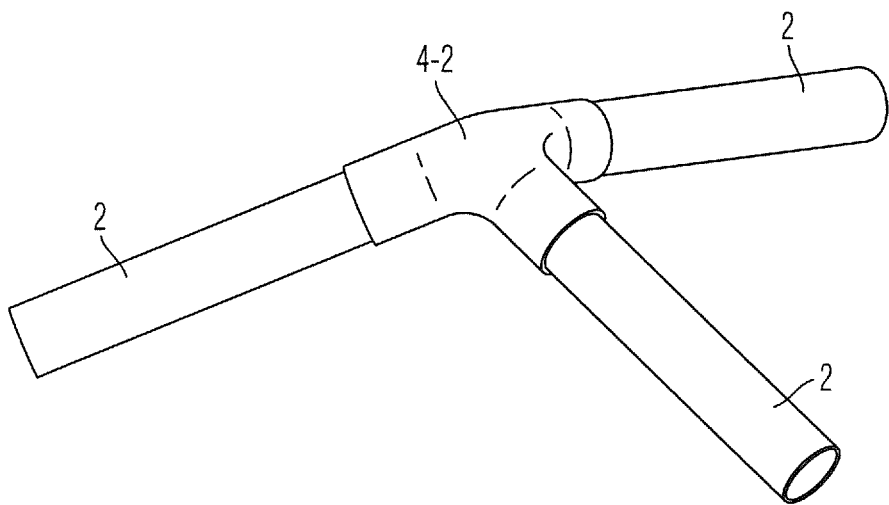

FIGS. 2A and 2B illustrate detailed views from different viewing angles of the axle carrier represented in FIG. 1, in which, in a node 3, the ends of three rods 2 meet, wherein in FIG. 2B the fiber windings 5 and joints shown in FIG. 2A are not represented. In order to define a relative orientation of the individual rods 2 to one another or to define the respective angles which the rods 2 to be connected form with one another, positioning elements 4-1, 4-2 configured as half-shells are provided at the ends of the respective rods 2 to be connected and rest on these at least in some portions, i.e. on supporting portions of the rods 2. The surfaces, facing the respective ends of the rods 2, of those portions of the positioning elements 4-1, 4-2 which rest on the ends of the rods 2 are tailored to the cross sections or circumferences of the corresponding portions of the rods 2 in order to define the relative orientation of the individual rods 2 in the fastened state. In the present case, the curvature of the surfaces of those portions of the positioning elements 4-1, 4-2 which rest on the ends of the rods 2 substantially corresponds to the radius of curvature of the rods 2. In other embodiments, rods 2 having a rectangular profile or a differently configured cross section can also be used, wherein the resting portions of the positioning elements 4-1, 4-2 are correspondingly adapted in order to form a positive connection. Preferably, both positioning elements 4-1, 4-2 are of one piece configuration, though, where appropriate, a one-piece and a multipart positioning element 4-1, 4-2 can also be used in combination in order to define the relative orientation of the rods 2 one to another.

For the positioning of the positioning elements 4-1, 4-2 or for the assembly of the support structure, these can be connected by use of an integrally bonded connection, for instance by means of an adhesive, to the ends or the supporting portions of the rods 2. However, embodiments of the rear axle carrier 1 in which no separate adhesive is used are also possible. As adhesives for connecting the positioning elements 4 to the rods, adhesives having a modulus of elasticity with a value greater than 100 mPa are in particular suitable, in order to meet the requirements with respect to the rigidity of the rear axle carrier 1.

By use of pretensioned fiber windings 5, which rest at least on segments of those portions of the positioning elements 4-1, 4-2 which rest on the ends of the rods 2, or rest on segments of the supporting portions of the positioning elements 4-1, 4-2, the positioning elements 4-1, 4-2 are pressed or drawn in the direction of those respective supporting portions of the rods 2 on which the positioning elements 4-1, 4-2 rest, whereby the rods 2, in the defined relative orientation one to another, are additionally secured by way of frictional engagement. As a result of this additional holding force due to the frictional engagement, the necessary adhesive surface can be reduced in size in comparison with the previously known support structure having only an adhesive joint, whereby a marked weight reduction can be obtained by means of the support structure according to the invention.

The fiber windings 5 can be formed from one or more individual fibers, which are respectively wound one or more times around an end portion of a rod 2 and the thereon resting supporting portion of the positioning element 4-1, 4-2. The individual fiber windings 5 are here respectively arranged in particular such that they enclose a respective end portion of a respective rod 2.

The fiber windings 5 can be a carbon fiber, a glass fiber, an aramid fiber or a natural fiber, as well as a combination of these. Furthermore, dry fibers or wet (i.e. resin-impregnated) fibers with or without binder system can be used as the fiber winding 5, wherein, as the resin system, thermosetting plastics or thermoplastics can be used.

The positioning elements 4 can include, for instance, a fiber-reinforced plastic and/or a metal. In the case of a positioning element 4 made of a fiber-reinforced plastic, this can be produced, for instance, by way of an injection molding process using short fibers, a wet-pressing process, a transfer molding using semifinished fiber products (preform) or using plate-like dough compounds made of thermosetting reaction resins and/or thermoplastic resins and fibers, such as, say, glass fibers, carbon fibers, aramid fibers, natural fibers or other fibers.

In order to avoid damage to the fiber winding 5, those portions of the positioning elements 4 on which the fiber winding 5 rests are preferably of smooth construction, i.e. without sharp edges. Furthermore, in order to enable an exact positioning of the fiber winding 5, the portions on which the fiber winding 5 rests have guide devices, which run in the direction of the fiber winding 5 and are formed, for instance, by grooves or depressions, in order to guide the fiber winding 5. Preferably, the guide devices are set up such that they guide the fiber windings 5 along a geodetic line, whereby the fiber windings are prevented from sliding off and the stability of the support structure is consequently increased.

In the represented illustrative embodiment, the three rods 2 to be connected respectively form the same angle with respect to one another. In other embodiments, the adjacent rods 2 can also however form different angles. Furthermore, the three rods 2 to be connected can all lie in one plane, or one of the rods 2 can also not lie in the plane spanned by the two other rods 2.

In another embodiment, also just one of the half-shells 4-1, 4-2 can be used, which half-shell is fastened to the rods 2 by way of the fiber windings 5 in a manner similar to that represented in FIGS. 2A and 2B. In order to achieve a sufficient stability of the corresponding support structure, in this case the fiber winding 5 is preferably placed or deposited on a larger portion of the half-shell 4-1, 4-2, which portion extends along the longitudinal direction of the rod 2.

Figure 3:
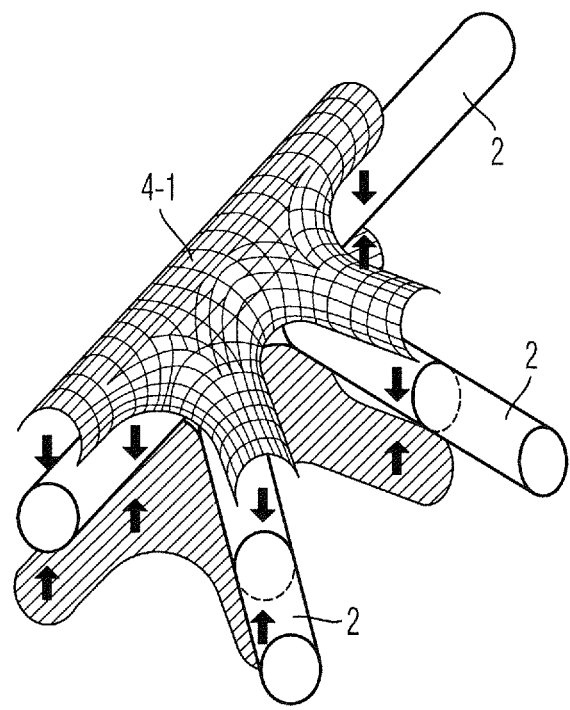
FIG. 3 shows a further embodiment of a truss joint.

FIG. 3 illustrates a schematic view of a joining together of the rods 2 and a half-shell 4-1 of a node 3 of the axle carrier 1 represented in FIG. 1, in which a continuous rod 2 is met by two further rods 2. The half-shell 4-1 is produced in accordance with the predefined relative orientation of the rods 2 to one another. As illustrated on the basis of the arrows in FIG. 3, the rods 2 can first be oriented relative to one another, and the half-shell 4-1 subsequently placed onto the ends or supporting portions of the rods 2 and fastened by way of fiber windings (not represented). On the other hand, the full-length rod 2 can also firstly, for instance, be connected to the half-shell 4-1 by means of the windings 5 and, where appropriate, by use of the adhesive, and the ends of the two other rods 2 are subsequently deposited in those portions of the half-shell 4-1 which are provided for this purpose, and are connected to these.

Figure 4:
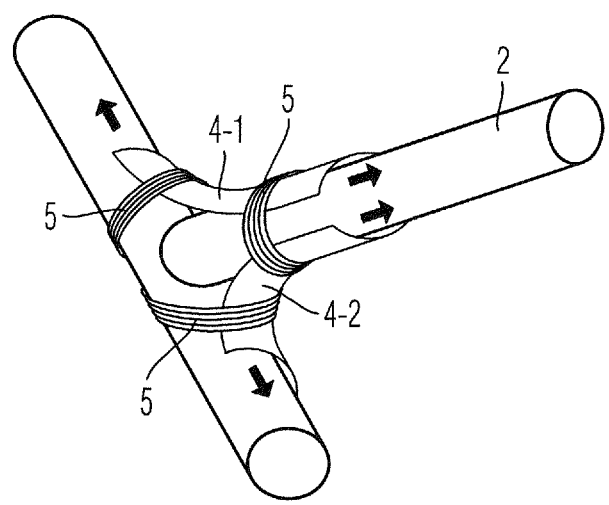
FIG. 4 shows a further embodiment of a truss joint in the form of a T-joint.

FIG. 4 shows a schematic view of a node 3 in the form of a T-joint of the axle carrier 1 shown in FIG. 1. Unlike the half-shells 4 shown in FIGS. 2 and 3, in the embodiment represented in FIG. 4 the positioning elements 4 are configured as tongues, which likewise can be fastened to the rods 2 by way of an integrally bonded connection, for instance an adhesive. The tongues can be formed of the same material as the half-shells. Unlike the half-shells, the tongues respectively cover only sections of the end portions of the first and second rod 2.

A first supporting portion of the first tongue 4-1 is drawn, by way of a first fiber winding 5 resting on the first supporting portion of the first tongue, in the direction of a corresponding supporting portion of the first rod 2, and a second supporting portion of the first tongue 4-1 is drawn, by way of a second fiber winding 5 resting on the second supporting portion of the first tongue 4-1, in the direction of a corresponding supporting portion of the second rod 2. The first and the second supporting portion of the first tongue 4-1 are connected by a curved connecting portion, which defines an angle which the first and the second rod 2 form with each other.

A first supporting portion of the second tongue 4-2 is drawn, by way of a third fiber winding 5 resting on the first supporting portion of the second tongue 4-2, in the direction of a corresponding supporting portion of the second rod 2, and a second supporting portion of the second tongue 4-2 is drawn, by way of the second fiber winding 5 also resting on the second supporting portion of the second tongue 4-2, in the direction of a corresponding supporting portion of the second rod 2. The first and the second supporting portion of the second tongue 4-2 are connected by a curved connecting portion, the curvature of which is chosen in dependence on the curvature of the connecting portion of the first tongue 4-1 in order likewise to define the angle which the first and the second rod 2 form with each other.

Figure 5:
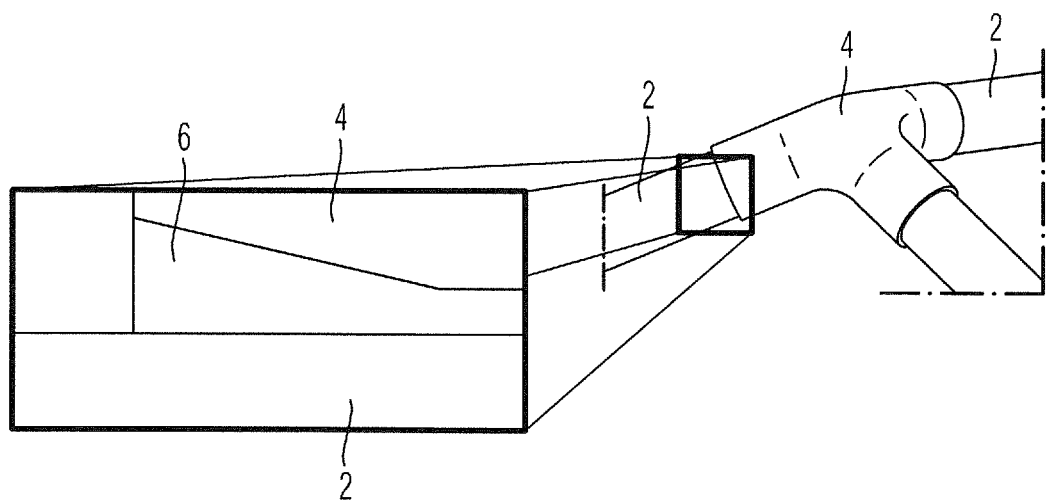
FIG. 5 is a view for illustrating the connection of a positioning element to rods.

FIG. 5 shows an arrangement consisting of a positioning element 4, an adhesive 6 and a rod 2 in conjunction with a longitudinal section along a longitudinal direction of the rod 2 according to one embodiment. As illustrated in FIG. 5, an end portion of the positioning element 4 configured as a half-shell, which end portion adjoins an exposed portion of the rod 2, can be configured such that a distance between that surface of the positioning element 4 which is facing the rod 2 and the rod 2 decreases steadily in the direction of the other end of the positioning element 4 down to a substantially constant value. In other embodiments, the distance between that surface of the positioning element 4 which is facing the rod 2 and the rod 2 can decrease in the direction of the other end of the positioning element 4, also by one or more increments, down to a substantially constant value. As a result of these arrangements, the quantity of adhesive 6 which is provided between the rod 2 and the positioning element 4 decreases in the direction of the other end of the positioning element 4, whereby notch effects can be improved and peak stresses dampened.

Additionally or alternatively thereto, in one embodiment (not shown) the adhesive 6 can include, for the further reduction of peak stresses, a protruding bead projecting beyond the end of the positioning element 4.

Preferably, the fitting of the fiber windings is realized using a winding machine developed by the wbk Institute for Production Engineering of the Karlsruhe Institute for Technology, which winding machine allows the fiber windings to be deposited with stationary rods and positioning element(s), that is to say that the individual workpieces do not have to be rotated about an axis. Through the use of this winding machine, the rods can advantageously be connected in an automated mass production process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A support structure in a framework construction, comprising:
    a first and a second rod of an axle carrier of a motor vehicle,
    a positioning element, and
    a first and a second fiber winding, wherein
        the positioning element defines an orientation of the first rod relative to an orientation of the second rod, and
        a first supporting portion of the positioning element is drawn by the first fiber winding in a direction of a supporting portion of the first rod, and a second supporting portion of the positioning element is drawn by the second fiber winding in the direction of a supporting portion of the second rod, in order to secure the first and the second rod in the defined relative orientation to each other via frictional engagement.

2. The support structure as claimed in claim 1, wherein the first and the second supporting portion of the positioning element have a respective guide device, by which the first and the second fiber winding are respectively guided.

3. The support structure as claimed in claim 1, wherein the first supporting portion of the positioning element is fastened to the supporting portion of the first rod, and the second supporting portion of the positioning element is fastened to the supporting portion of the second rod, additionally via integrally bonded connections, respectively.

4. The support structure as claimed in claim 3, wherein the integrally bonded connections are realized by respective adhesives provided between the first supporting portion of the positioning element and the supporting portion of the first rod, and the second supporting portion of the positioning element and the supporting portion of the second rod.

5. The support structure as claimed in claim 4, wherein a distance between an end portion of the positioning element, which end portion adjoins an exposed portion of the first rod, decreases steadily or incrementally in the direction of another end portion of the positioning element down to a substantially constant value.

6. The support structure as claimed in claim 4, wherein, adjoining the end portion of the positioning element, a protruding bead of adhesive, is formed.

7. The support structure as claimed in claim 1, wherein the positioning element is configured as a half-shell, a surface thereof facing the supporting portion of the first rod rests by positive engagement on the supporting portion of the first rod.

8. The support structure as claimed in claim 1, wherein the positioning element is configured as a tongue, and the first supporting portion and the second supporting portion of the positioning element are connected by a curved portion.

9. The support structure as claimed in claim 1, wherein the fiber windings comprise at least one fiber, selected from a group of: a carbon fiber, a glass fiber, an aramid fiber and a natural fiber.

10. The support structure as claimed in claim 9, wherein the at least one fiber is embedded in a matrix material, selected from a group of: a thermoplastic matrix material and a thermosetting matrix material.

11. The support structure as claimed in claim 1, wherein the first rod and/or the second rod comprise a fiber-reinforced plastic or a metal.

12. The support structure as claimed in claim 1, wherein the positioning element is formed from a plastic, a fiber-reinforced plastic or from a metal.

13. A method for producing a support structure in a framework construction, the method comprising the acts of:
arranging a first supporting portion of a positioning element on a supporting portion of a first rod of an axle carrier of a motor vehicle;
arranging a second supporting portion of the positioning element on a supporting portion of a second rod of the axle carrier of a motor vehicle;
connecting the first supporting portion of the positioning element to the supporting portion of the first rod by a fiber winding, which draws the first supporting portion of the positioning element in the direction of the supporting portion of the first rod, and connecting the second supporting portion of the positioning element to the supporting portion of the second rod by a second fiber winding, which draws the second supporting portion of the positioning element in the direction of the supporting portion of the second rod, in order to secure the first and the second rod in a defined relative alignment to each other via frictional engagement.

14. The method as claimed in claim 13, wherein the first and the second supporting portion of the positioning element have a respective guide device, and portions of the first and of the second fiber winding are respectively inserted into the corresponding guide device.

15. The method as claimed in claim 14, wherein the first supporting portion of the positioning element is fastened to the supporting portion of the first rod, and the second supporting portion of the positioning element is fastened to the supporting portion of the second rod, additionally via integrally bonded connections, respectively.

16. The method as claimed in claim 15, wherein, for creating the integrally bonded connections, respective adhesives are provided between the first supporting portion of the positioning element and the supporting portion of the first rod, and the second supporting portion of the positioning element and the supporting portion of the second rod.

17. The method as claimed in claim 16, wherein a distance between an end portion of the positioning element, which end portion adjoins an exposed portion of the first rod, decreases steadily or incrementally in the direction of another end portion of the positioning element down to a substantially constant value.

18. The method as claimed in claim 16, wherein, adjoining the end portion of the positioning element, a protruding bead of adhesive is formed.

19. The method as claimed in claim 13, wherein the positioning element is configured as a half-shell, a surface thereof facing the supporting portion of the first rod is placed by positive engagement on the supporting portion of the first rod.

20. The method as claimed in claim 13, wherein the positioning element is configured as a tongue, and the first supporting portion and the second supporting portion of the positioning element are connected by a curved portion.

* * * * *